US008145368B2

(12) United States Patent
Won et al.

(10) Patent No.: US 8,145,368 B2
(45) Date of Patent: Mar. 27, 2012

(54) METHOD AND SYSTEM FOR MERGE CONTROL IN AN AUTOMATED VEHICLE SYSTEM

(75) Inventors: Jin Myung Won, Busan (KR); Ingmar Andreasson, Frolunda (SE)

(73) Assignee: POSCO (KR)

( * ) Notice: Subject to any disclaimer, the term of this patent is extended or adjusted under 35 U.S.C. 154(b) by 0 days.

(21) Appl. No.: 12/994,540

(22) PCT Filed: May 26, 2009

(86) PCT No.: PCT/KR2009/002787

§ 371 (c)(1), (2), (4) Date: Feb. 9, 2011

(87) PCT Pub. No.: WO2009/145551

PCT Pub. Date: Dec. 3, 2009

(65) Prior Publication Data

US 2011/0125350 A1 May 26, 2011

(30) Foreign Application Priority Data

May 26, 2008 (KR) ........................ 10-2008-0048863

(51) Int. Cl.
*G05D 1/00* (2006.01)
*G08G 1/00* (2006.01)

(52) U.S. Cl. ......................................... 701/20; 701/119

(58) Field of Classification Search .................... 701/20, 701/117, 119; 246/182
See application file for complete search history.

(56) References Cited

U.S. PATENT DOCUMENTS

| | | | | |
|---|---|---|---|---|
| 3,941,201 | A * | 3/1976 | Hermann et al. | 180/168 |
| 5,108,052 | A | 4/1992 | Malewicki et al. | |
| 6,029,104 | A | 2/2000 | Kim | |
| 6,135,396 | A * | 10/2000 | Whitfield et al. | 246/182 R |
| 6,198,993 | B1 * | 3/2001 | Higashi et al. | 701/23 |
| 6,318,274 | B1 * | 11/2001 | Park | 104/88.02 |
| 7,302,319 | B2 * | 11/2007 | Wu | 701/19 |
| 2004/0225421 | A1 | 11/2004 | Wu | |

FOREIGN PATENT DOCUMENTS

KR 100250021 B1 3/2000

OTHER PUBLICATIONS

Abstract, KR 100176278 entitled "The Position Acquisiting Apparatus for Passenger Rapid Transit System", Inventor: Kim, published May 15, 1999, equivalent to U.S. Patent No. 6,029,104.

* cited by examiner

*Primary Examiner* — Isam Alsomiri
(74) *Attorney, Agent, or Firm* — The Webb Law Firm

(57) ABSTRACT

A method of controlling merging of a plurality of streams of vehicles in an automated vehicle system. The method comprises: Defining a merge control zone associated with a merge point, the merge control zone defining at least respective sections of the upstream tracks leading to the merge point; detecting a vehicle entering the merge control zone on a first one of the upstream tracks; allocating a passage time to the vehicle, the passage time being indicative of a time at which the vehicle is scheduled to pass the merge point; wherein allocating the passage time is based on a merge priority assigned to the vehicle according to a predetermined set of merge priority rules; controlling a speed of the vehicle responsive to the allocated passage time.

20 Claims, 5 Drawing Sheets

[Fig. 1]
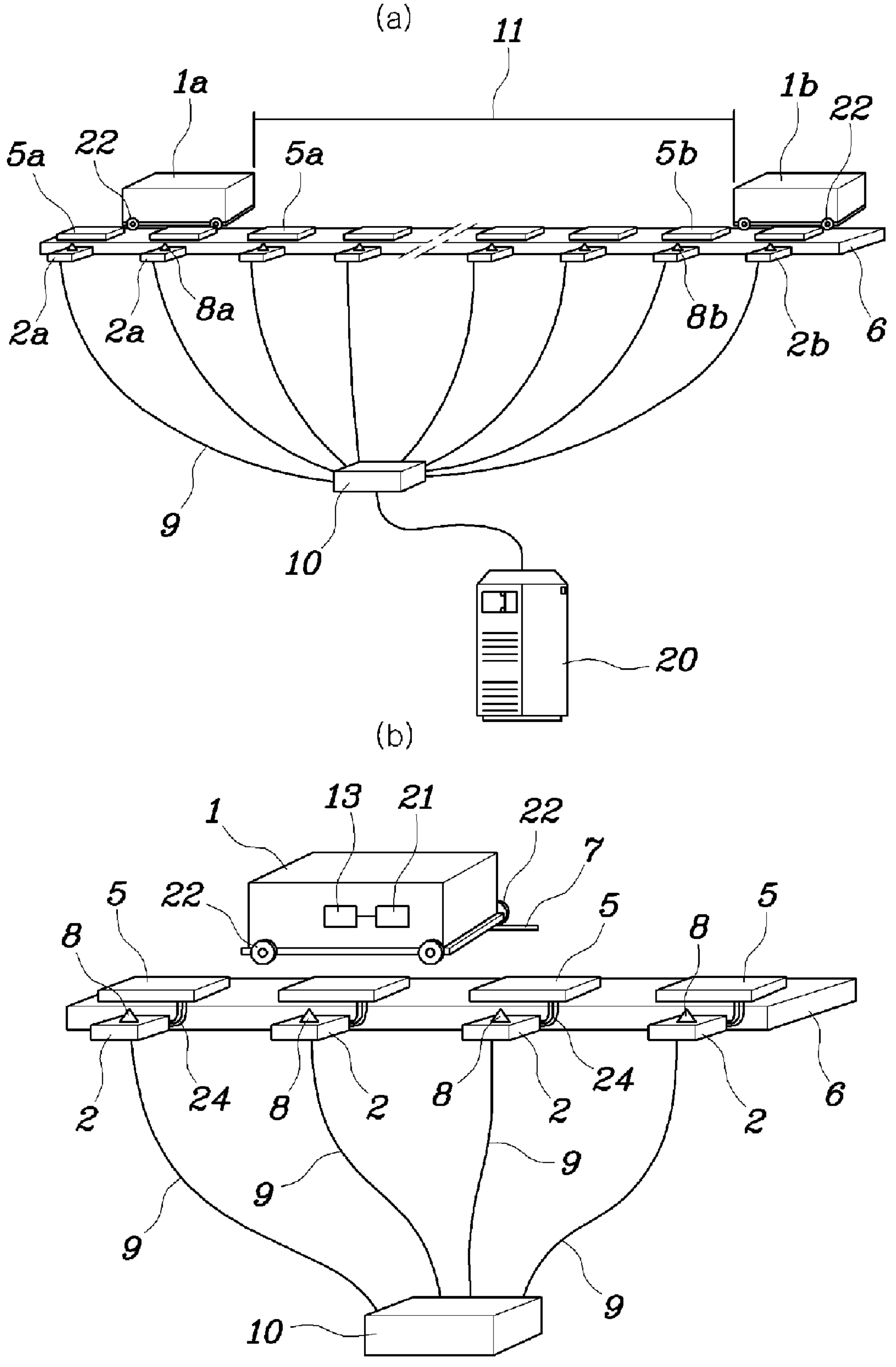

[Fig. 2]
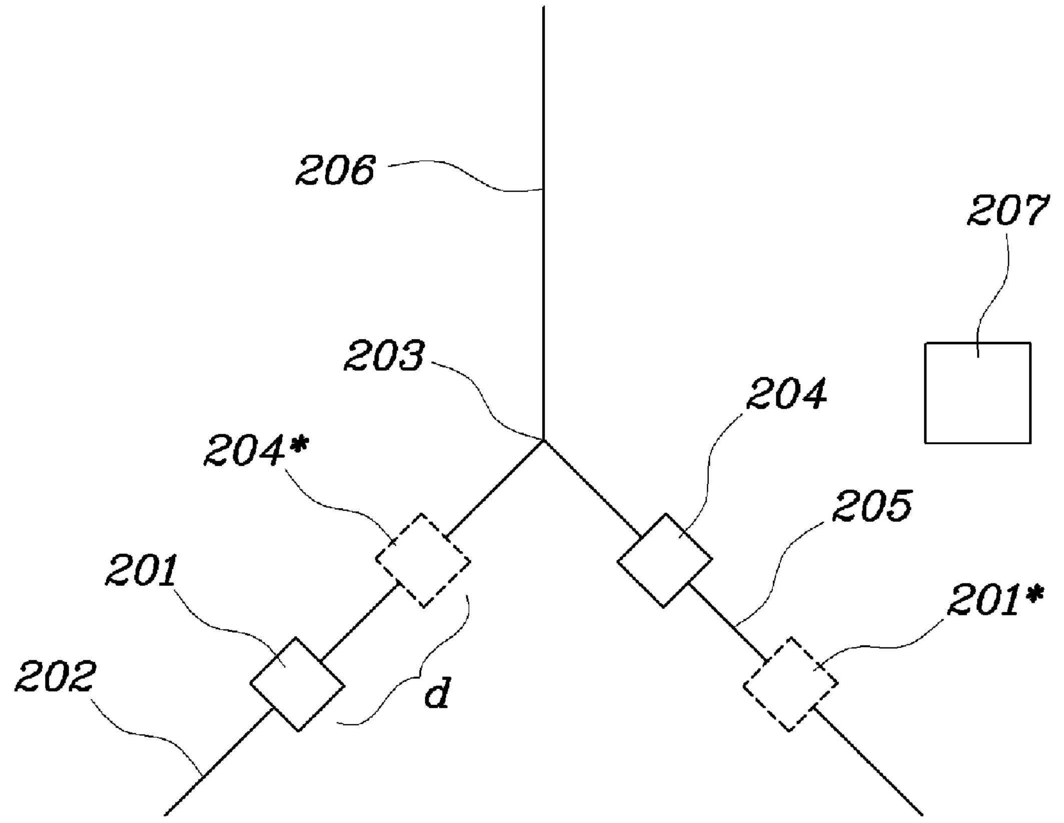

[Fig. 3]
(a)
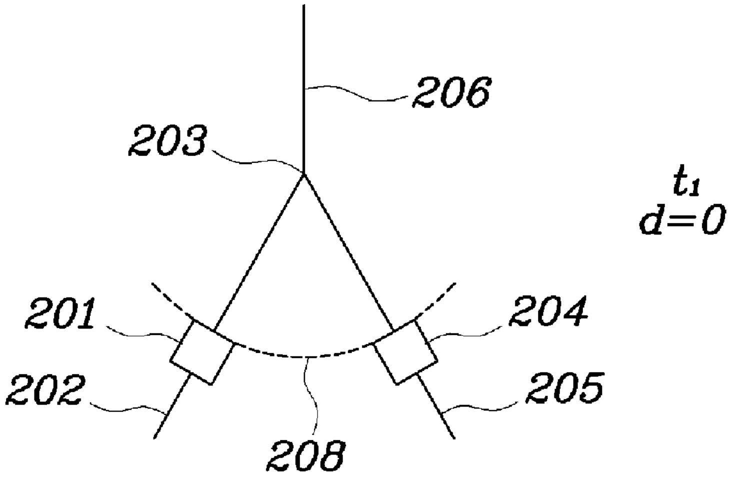
(b)
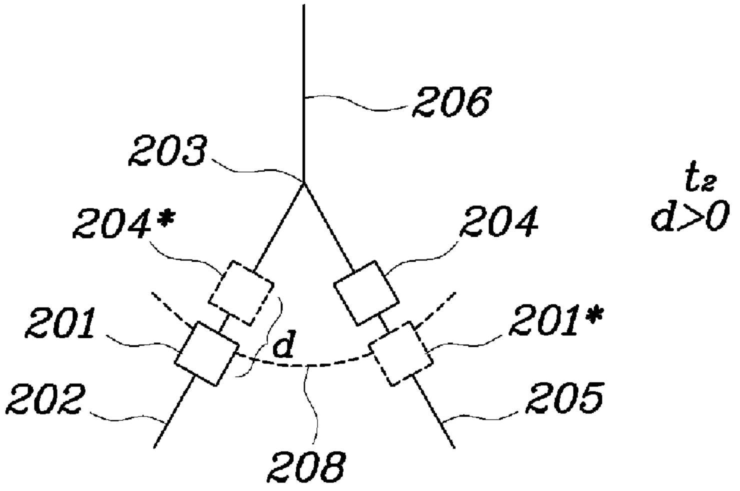
(c)
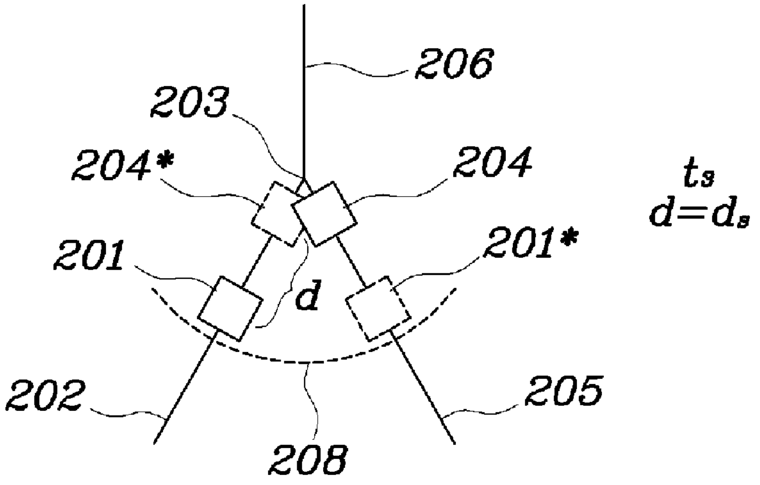

[Fig. 4]
(a)
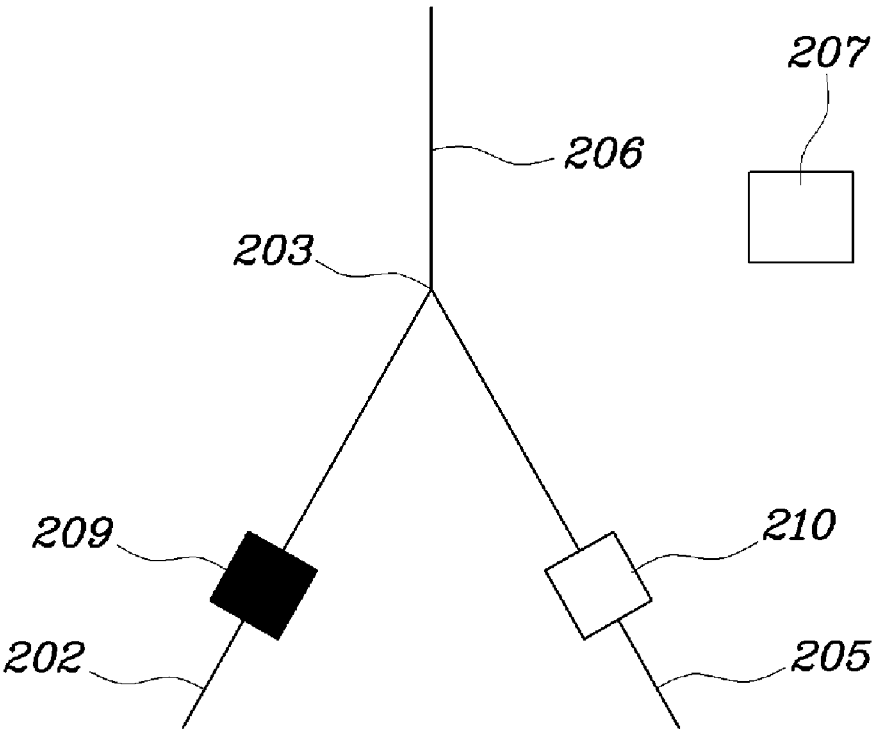
(b)
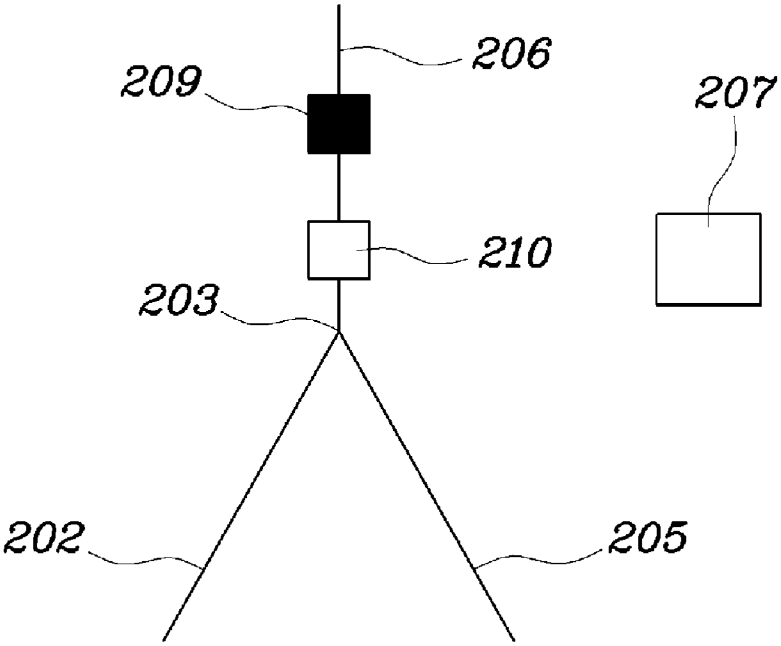

[Fig. 5]
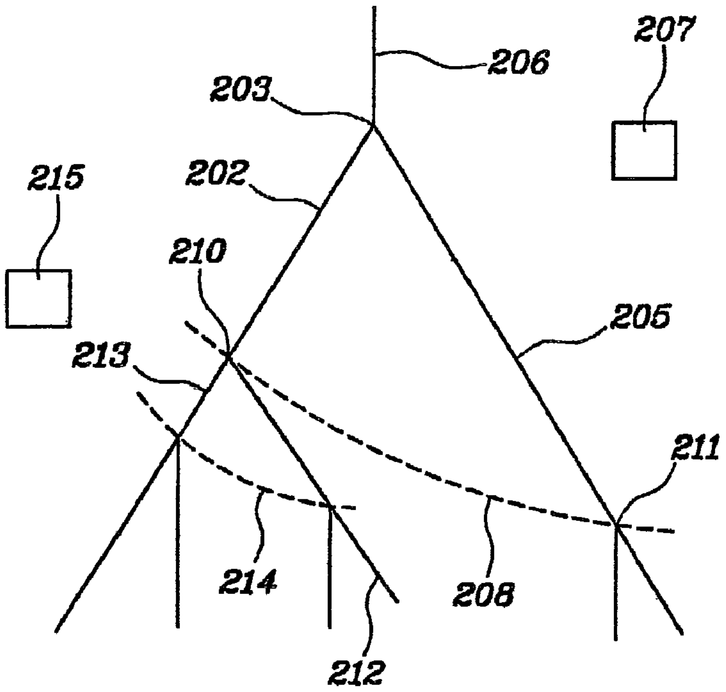
[Fig. 6]
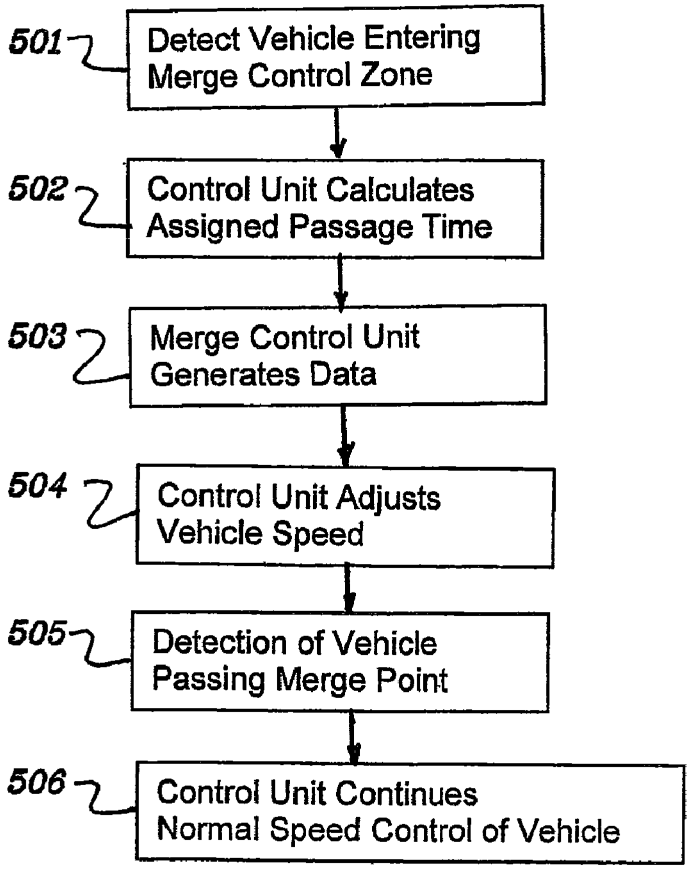

METHOD AND SYSTEM FOR MERGE CONTROL IN AN AUTOMATED VEHICLE SYSTEM

TECHNICAL FIELD

This invention generally relates to merge control and, in particular, safe and smooth merge control in automated vehicle systems, in particular so called Personal Rapid Transit systems (referred to as "PRT").

BACKGROUND ART

Personal rapid transit systems include small vehicles offering individual transport service on demand. This invention relates to automated vehicle systems such as personal rapid transit systems with vehicles travelling along tracks forming a network of stations, merges, and diverges interconnected by unidirectional links in the form of tracks. PRT vehicles may be constructed to be compact and light which in turn allows the PRT guide-way (track) structure to be light compared with conventional railroad systems such as conventional tramways or metro systems. Therefore, the construction cost of the PRT system is much lower than that of alternative solutions. A PRT system is more friendly to the environment, since it has less visual impact and generates low noise, and it does not produce local air pollution. Further, PRT stations can be constructed inside an existing building. On the other hand, since the headway/free distance may be kept comparably short, the traffic capacity of a PRT system is comparable with the existing traffic means such as bus and tramway.

Stations are normally located off-line on sidetracks so that stopping vehicles do not hinder passing vehicles.

The guideway/track network of a PRT system generally comprises unidirectional links/tracks and nodes (so-called merges or merge points) where two or more upstream tracks merge to form a downstream track as well as nodes (so-called diverges) where an upstream track divides to form two or more downstream tracks. An important issue for vehicles approaching diverges is the choice of route, while important issues for vehicles approaching a merge is safety, efficiency, and comfort. The present invention is concerned with safe and efficient merging strategies in PRT networks as well as in other networks where automated vehicles are travelling.

Generally, in a merge, two streams of vehicles come together and therefore a merge is a potential bottleneck for capacity. Whatever flow can pass through a merge can pass freely through the downstream network until the next merge. Merge capacity is thus dimensioning system capacity.

In typical automated vehicle systems no more than two streams of vehicles come together at a merge. However, it will be appreciated that the method described herein may also be applied in connection with merges where more than two vehicle streams merge.

Merges are also points of possible conflict in a PRT network and therefore safety critical. Normal methods for monitoring safe distance between vehicles are not sufficient for safety control in merges.

Generally a PRT system includes a speed control system for controlling speed and distance between vehicles. There are two main principles for vehicle control in PRT systems. With synchronous control vehicles are made to follow synchronously moving slots with constant time spacing, dimensioned to secure a safe distance at all permitted speeds in the network. Before a vehicle is allowed to depart from a station it is assigned a slot all the way to its destination. All bookings of merge passages need to be administered by a central computer. In a heavily loaded system, vehicles have to wait longer (taking up space) for a free slot, especially if its route passes through several merges. The usable capacity in a synchronous system is only about 65% of the theoretical link capacity. Regarding safety, as long as all vehicles follow their assigned slots there should be no merge conflicts.

With asynchronous control, merge conflicts are resolved locally as in car traffic. Vehicles can depart from a station as soon as there is a free slot on the main guideway but they may have to slow down or even stop before going through a merge. Traffic through a merge is controlled by a local merge controller independent of central control. Congestion can be reduced by dynamic routeing avoiding merges which tend to be overloaded. Merge capacities can be utilised up to 100% and vehicles can be dynamically rerouted if necessary. Thus, generally asynchronous control provides an improved system capacity, routeing flexibility and robustness towards disturbances.

U.S. 2004/0225421 describes a PRT system and a method of controlling movement of vehicles by means of a central control system, a wayside control system and a vehicle control system. When the wayside control system detects the identification of the approaching vehicle, the appropriate switch positions will be set and verified according to the traffic flow instruction from the central control system. However this document does not describe how to obtain a safe and smooth merge control.

DE 1.377.713 relates to vehicles moving freely in traffic systems, e.g. road traffic. The document describes a method of bringing together at an entry point on a single track, two converging streams of vehicular traffic, each stream moving along its individual lane. The movement of vehicles is based on inter-vehicle communication and always applies first-come-first-served. Since the method comprises manual operation by driver, driver support system and distance measuring onboard vehicle, the method is not readily applicable to PRT systems.

A traffic-light function as in car traffic may protect against merge conflicts in a PRT system, but would reduce capacity, since vehicles often would have to accelerate from standstill, thus creating longer inter-vehicle gaps than necessary and reduced speed through the merge.

It thus remains a problem to obtain a safe and smoother merge control in automated vehicle systems such as PRT systems. In particular, it is desirable to provide a merge control method and system that ensure safe distances between vehicles in merging vehicle flows while at the same time maintaining full capacity and smooth motion control for passenger comfort.

SUMMARY OF THE INVENTION

Disclosed herein is a method of controlling merging of a plurality of streams of vehicles in an automated vehicle system, the automated vehicle system including a network of tracks along which the vehicles are adapted to travel, the network including at least one merge point at which at least two upstream tracks merge to form a downstream track.

Embodiments of the method comprise:

- defining a merge control zone associated with the merge point, the merge control zone defining at least respective sections of the upstream tracks;
- detecting a vehicle entering the merge control zone on a first one of the upstream tracks, the vehicle being a vehicle of a sequence of one or more vehicles approaching the merge point on said first upstream track;

allocating a passage time to the detected vehicle, the passage time being indicative of a time at which the vehicle is scheduled to pass the merge point; wherein allocating the passage time is based on a merge priority assigned to the vehicle according to a predetermined set of merge priority rules;

controlling a speed of the vehicle responsive to the allocated passage time.

Hence, the vehicle speed and position of a vehicle is controlled within a merge control zone upstream of the merge point so that vehicles can pass through the merge at full speed and at minimum safe spacing.

The allocation of a passage time may be performed immediately upon detection of the vehicle entering the merge control zone. Alternatively, the allocation of passage time may be later than at the entrance of the merge control zone, as long as the passage time allocation takes place well before the merge in order to ensure safety. If a first upstream track is longer than a second upstream track, the allocation of passage time can thus be delayed, so that vehicles on both the first and the second upstream track receive their passage time allocation at the same distance from the merge point. Otherwise the vehicles on the first upstream track, which is longest, may always get an earlier passage time than the vehicles on the second upstream track. For example, such a situation may occur when the merge control zones are defined such that they cover the entire upstream tracks from the merge to the next upstream node, e.g. the next upstream merge point. Therefore, passage times are allocated at some point upon entrance in the merge control zone and before the merge point.

In some embodiments, the control may even extend beyond the next upstream merge by communication between their respective merge controllers.

Since the assignment of a passage time through the merge point is based on predetermined rules for assigning priorities to different vehicles, the method allows an optimisation of the overall system capacity and/or other overall performance parameters, such as the average passenger travel time.

It is an advantage of the method and system described herein that it provides an increased capacity. The capacity through the merge may even be the same as the capacity on a link. A further advantage is that the speed adjustments can be smooth and generally avoid stopping before the merge.

The passage time may be defined as a point in time, as a time interval, or in any other suitable way.

In embodiments of the method described herein, each vehicle entering a merge control zone is detected and allocated a passage time at some time after having entered the merge control zone and before reaching the merge point.

In some embodiments, at least one merge priority rule is a function of a property of at least one vehicle of said sequence of vehicles. Examples of such properties include a load status of the vehicle, e.g. whether the vehicle carries passengers (or other goods) or is empty. For example, a higher merge priority may be assigned to loaded vehicles than to empty vehicles.

Further examples of such properties include the vehicle's position (absolute or relative to the merge or relative to one or more other vehicles) and/or speed. A merge priority rule may also be a function of respective properties of more than one vehicle of said sequence of vehicles.

When at least one merge priority rule is a function of a property of a sequence of vehicles, a further improvement of the overall system performance is facilitated.

For example, such a property may be the length of the sequence. For example, a higher priority may be assigned to a vehicle followed by a first number of vehicles than to another vehicle followed by a second number of vehicles, the second number being smaller than the first number. An advantage of this embodiment is that the risk of queues may be minimised.

In some embodiments the method comprises monitoring a distance between the vehicle and at least another vehicle in the merge control zone, the other vehicle travelling along a second one of the upstream tracks different from the first track, thereby ensuring safe merging.

In some embodiments monitoring comprises representing the other vehicle by a virtual shadow vehicle travelling along the first upstream track at a position corresponding to a position of the other vehicle along the second upstream track; and monitoring the distance as a distance between the vehicle and the shadow vehicle.

It is a further advantage of embodiments of this invention that the merge controller can monitor merging vehicles by substantially the same algorithms as vehicles on the same link.

In some embodiments, the method comprises controlling the vehicle speed of at least one of the vehicle and the other vehicle so as to maintain a predetermined minimum distance between the vehicle and the other vehicle. In some embodiments, the minimum distance is a function of a vehicle distance of at least one of the vehicle and the other vehicle from the merge point, wherein the minimum distance increases with decreasing vehicle distance from the merge point. Thus, the accepted distance to a shadow vehicle is gradually increased as vehicles get closer to the merge. When the vehicles arrive at the merge, or reach a predetermined overlap zone immediately upstream of the merge, a safe distance corresponding to the safe distance on a single track may be reached. Hence, the distance between a vehicle and the one or more other vehicles in the merge control zone gradually increases whereby smooth motion is obtained while maintaining safety at all the time.

The present invention relates to different aspects including the method described above and in the following, and corresponding systems, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a control system for controlling merging of a plurality of streams of vehicles in an automated vehicle system, the automated vehicle system including a network of tracks along which the vehicles are adapted to travel, the network including at least one merge point at which at least two upstream tracks merge to form a downstream track. The system comprises:

means for detecting a vehicle entering a merge control zone associated with the merge point on a first one of the upstream tracks, the merge control zone defining at least respective sections of the upstream tracks, the vehicle being a vehicle of a sequence of one or more vehicles approaching the merge point on said first upstream track;

means for allocating a passage time to the vehicle, the passage time being indicative of a time at which the vehicle is scheduled to pass the merge point; wherein allocating the passage time is based on a merge priority assigned to the vehicle according to a predetermined set of merge priority rules;

means for controlling a speed of the vehicle responsive to the allocated passage time.

In some embodiments, the system includes a wayside controller adapted to monitor all vehicles approaching the merge.

Advantageous Effects

This invention provides a merge control method and system that ensure safe distances between vehicles in merging vehicle flows while at the same time maintaining full capacity and smooth motion control for passenger comfort.

BRIEF DESCRIPTION OF DRAWINGS

The above and/or additional objects, features and advantages of the present invention, will be further elucidated by the following illustrative and non-limiting detailed description of embodiments of the present invention, with reference to the appended drawings, wherein:

FIG. 1 schematically shows an example of a part of a personal rapid transit system;

FIG. 2 schematically shows the concept of shadow vehicles;

FIG. 3 schematically shows the distance increase between vehicles in a merge control zone;

FIG. 4 schematically shows an example of a merge control priority;

FIG. 5 schematically shows an example of a merge control zone; and

FIG. 6 shows a flowchart of the merge control method.

DETAILED DESCRIPTION OF THE INVENTION

In the following description, reference is made to the accompanying figures, which show by way of illustration how the invention may be practiced.

FIG. 1 schematically shows an example of a part of a personal rapid transit system with in-track type linear induction motor. The personal rapid transit system comprises a track, a section of which is shown in FIG. 1 designated by reference numeral 6. The track typically forms a network, typically including a plurality of merges and diverges. The personal rapid transit system further includes a number of vehicles, generally designated by reference numeral 1. In this example, the vehicles run on wheels along a track by the propelling power of linear induction motors (LIM). Normally each vehicle may carry 3 or 4 passengers, but it is understood that a vehicle can carry more or less passengers. FIG. 1*a* shows a track section 6 with two vehicles 1*a* and 1*b* , while FIG. 1*b* shows an enlarged view of a single vehicle 1. Even though only two vehicles are shown in FIG. 1*a* , it is understood that a personal rapid transit system may include any number of vehicles. Generally, each vehicle typically includes a passenger cabin supported by a chassis or framework carrying wheels 22. An example of a PRT vehicle is disclosed in international patent application WO 04/098970, the entire contents of which are incorporated herein by reference.

The personal rapid transit system of FIG. 1 comprises an in-track type linear induction motor including a plurality of primary cores, generally designated by reference numeral 5, periodically arranged in/along the track 6. In FIG. 1*a* vehicles 1*a* and 1*b* are shown in locations above primary cores 5*a* and 5*b*, respectively. Each vehicle has a reaction plate 7 mounted at a bottom surface of the vehicle. The reaction plate 7 is typically a metal plate made from aluminium, copper, or the like on a steel backing plate.

Each primary core 5 is controlled by a motor controller 2 which supplies a suitable AC power to the corresponding primary core so as to control the thrust for accelerating or decelerating the vehicle. The thrust is imparted by the primary core 5 on the reaction plate 7, when the reaction plate is located above the primary core. To this end, each motor controller 2 includes an inverter or switching device, e.g. a solid state relay (SSR) for switching current (phase angle modulation), that feeds a driving power to the primary core 5. The motor controller 2 controls the voltage/frequency of the driving power in accordance with an external control signal 9. Generally, the electro-magnetic thrust generated between the plate 7 and the primary core 5 is proportional to the area of the air gap between the plate and the primary core, if conditions such as the density and the frequency of flux are the same. Motor controllers may be positioned adjacent to each primary core or in a cabinet which is easier to access for maintenance. In the latter case one motor controller may be switched to control several primary cores.

The system further comprises a plurality of vehicle position detection sensors for detecting the position of the vehicles along the track. In the system of FIG. 1, vehicle position is detected by vehicle position sensors 8, adapted to detect the presence of a vehicle in a proximity of the respective sensors. Even though the vehicle position sensors 8 in FIG. 1 are shown arranged along the track 6 together with the plurality of the primary cores 5, other positions of vehicle position sensors are possible. In particular, each vehicle may include one or more on-board vehicle position detection sensors such that each vehicle transmits position and speed to the motor controllers as measured by the on-board vehicle sensors.

The vehicle position sensors may detect the vehicle presence by any suitable detection mechanism. In preferred embodiments, the vehicle position sensors detect further parameters such as vehicle speed, direction, and/or a vehicle ID.

The term vehicle position detection sensor is meant to refer to any means for detecting the position and speed of vehicles, such as wayside sensors, on-board sensors, in-track sensors etc.

Alternative or additionally, the position and speed of vehicles may be detected by other types of vehicle detection means, e.g. on-board dead reckoning, where the current position of a vehicle is estimated based on a previously determined position and advancing that position based upon known speed, elapsed time and course.

The system further comprises one or more zone controllers 10 for controlling operation of at least a predetermined section or zone of the PRT system. For example, the section controlled by a zone controller may include or constitute a merge control zone of a merge point as described herein. Each zone controller is connected with the subset of the motor controllers 2 within the zone controlled by the zone controller 10 so as to allow data communication between each of the motor controllers 2 with the corresponding zone controller 10, e.g. by means of a wired communication through a point-to-point communication, a bus system, a computer network, e.g. a local area network (LAN), or the like. Alternatively or additionally, the zone controller may be configured to communicate with the motorised vehicles or with track-mounted motors via e.g. a wireless communications channel, e.g. via radio-frequency communications. Even though FIG. 1 only depicts a single zone controller, it is understood that a PRT system normally includes any suitable number of zone controllers. Different parts/zones of the system may be controlled by their respective zone controllers, thereby allowing an expedient scaling of the system as well as providing operation of the individual zones independently of each other. Furthermore, though not depicted in FIG. 1, each zone controller 10 may be constructed as a plurality of individual controllers so as to provide a distributed control over motor controllers in a zone, e.g. the motor controllers of a predetermined part of a track. Alternatively or additionally, a plurality of zone controllers may be provided for each zone so as to enhance the reliability through redundancy, or to provide a direct communication path to different groups of zone controllers.

The zone controller 10—upon receipt of a suitable detection signal from a motor controller indicating the position and the vehicle ID of a detected vehicle—recognizes the position of each vehicle (1;1*a*,1*b*). As an alternative, position and speed can be received directly from the vehicle. The zone controller may maintain a real-time database system with respective records for all vehicles within the zone controlled by the zone controller.

Furthermore, the zone controller computes the distance between two vehicles, as indicated by distance 11 between vehicles 1*a*and 1*b*. The zone controller 10 thus determines respective desired/recommended speeds of the vehicles 1*a*, 1*b* in accordance with the computed distance 11 between the two vehicles, so as to maintain a desired minimum headway or safe distance between vehicles and so as to manage the overall traffic flow within the dedicated zone. The zone controller may thus returns information about the free distance and the desired/recommended speed of a detected vehicle to the motor controller at the location at which the vehicle was detected. Alternatively, the zone controller may determine a desired degree of speed adjustment and transmit a corresponding command to the motor controller.

In some embodiments it may be sufficient that the zone controller returns only speed commands to the motor controllers.

Alternatively or additionally, speed may also be calculated by the motor controller based on a confirmed free distance. Thus, safe control does not depend on uninterrupted communication with the zone controller, since the motor controller may calculate the speed based on the last known free distance for the vehicle.

The PRT system may further comprise a central system controller 20 connected to the zone controllers 10 so as to allow data communication between the zone controllers and the central system controller 20. The central system controller 20 may be installed in the control center of the PRT system and be configured to detect and control the running state of the overall system, optionally including traffic management tasks such as load prediction, empty vehicle management, passenger information, etc.

Each vehicle 1 may include a vehicle controller, generally designated 13, for controlling operation of the vehicle. In particular, the vehicle controller 13 may control operation of one or more emergency brakes 21 installed in the vehicle 1.

FIG. 1 shows an example of an in-track PRT system with the primary cores positioned along the track. It will be understood however, that the merge control described herein may be applied to any kind of track network system where automated vehicles are travelling, and in particular to any kind of PRT system, e.g. on-board systems where the primary cores and motor controllers are placed on board the vehicle. Hence, in such an embodiment, the zone controller may communicate information about a free distance and/or speed commands to the vehicle, e.g. via a suitable wireless communications channel.

FIG. 2 schematically illustrates the concept of shadow vehicles. The idea of shadow vehicles is that if a vehicle is travelling on an upstream track in a merge control zone, other vehicles on other upstream tracks in the merge control zone will be treated as also being positioned on the same track as that vehicle.

FIG. 2 shows a vehicle 201 travelling on an upstream track 202 towards a merge point 203. After passing the merge point 203 the vehicle 201 will travel on the downstream track 206. Another vehicle 204 is shown travelling on another upstream track 205 towards the same merge point 203, and after passing the merge point 203 the vehicle 204 will travel on the same downstream track 206 as vehicle 201. To avoid that the two vehicles 201, 204 collide at the merge point 203, the vehicles must be spaced by a safety distance $d_s$ at the merge point 203.

FIG. 2 further shows a zone controller 207 controlling the part of the upstream tracks 202 and 205 located within a predetermined merge zone 208 defined with respect to the merge point 203. For example, the merge zone may be defined so as to cover a certain upstream track section of each upstream track. The lengths of the merge zone may be selected according to the typical vehicle speeds, typical inter-vehicle distances, braking and acceleration performance of the vehicles, desired smoothness of the changes of vehicle speed and/or other factors.

In order to calculate the distance d between the vehicles, when the merge controller 207 detects a vehicle entering the merge control zone 208 on one of the upstream tracks, the merge controller assigns a virtual shadow vehicle to the vehicle, such that the shadow vehicle travels at the same distance from the merge point and at the same speed as the detected real vehicle, but on the other upstream track. For example, upon detection of a vehicle entering the merge zone, the zone controller may create a record in its database representative of the shadow vehicle in addition to the corresponding record of the real vehicle. The zone controller may maintain the record of the shadow vehicle by copying (e.g. periodically or every time an entry in the record of the real vehicle changes) all attributes of the corresponding record of the real vehicle, except with a corresponding position on the other upstream track, and with an attribute/flag that the shadow vehicle is a shadow vehicle, e.g. by means of a reference to the corresponding real vehicle.

In the example of FIG. 2, the shadow vehicle 204* of the real vehicle 204 is shown on track 202 in a position corresponding to the real vehicle 204 on track 205. As long as vehicle 204 has not reached the merge point 203, the merge controller 207 maintains corresponding positions and speed of the shadow vehicle 204*. When the vehicle 204 reaches the merge point 203, the merge controller 207 removes the shadow vehicle. Similarly, shadow vehicle 201* of vehicle 201 is shown on track 202.

The merge control unit 207 thus monitors the distance d between the real vehicle 201 and the preceding shadow vehicle 204* on the same track 202, e.g. in a similar manner as zone controllers monitor the distance between vehicles on the same track as described above.

The merge control unit 207 further assigns a priority value to each vehicle approaching the merge point. For example, the merge priorities may be assigned to the vehicles based on information about all vehicles within the zone controlled by the merge controller 207 and, optionally, further based on information about vehicles that are travelling upstream outside the zone controlled by the merge controller. For example, the merge controller may receive information from one or more other zone controllers, e.g. via a wired or wireless communications link between zone controllers and/or from a central system controller. In alternative embodiments, the priorities may be assigned by a central control unit. In some embodiments, the merge priorities may, once assigned, be changed, e.g. due to changes in the traffic situation. The assignment of merge priorities will be described in more detail below.

Based on the monitored position of and the spacing between vehicle 201 and shadow vehicle 204* and based on the assigned priorities, the control unit 207 decides which vehicle should pass through the merge point 203 first, according to the predetermined merge control priorities. The control unit 207 assigns a passage time for each vehicle for passing through the merge point 203.

The speed of the vehicles may have to be adjusted in accordance with the assigned passage times. To this end, in the case of on-board speed control of the vehicles, the control unit may communicate and the assigned passage time to each vehicle 201, 204, thus allowing the vehicles to adjust their respective speeds. Alternatively, the control unit 207 may determine speed commands for causing the vehicles to accelerate or brake by predetermined amounts, and transmit one or more speed commands to each vehicle and/or to motor controllers located along the track. The control unit 207 communicates with the vehicles and/or with track-based motor controllers, e.g. by means of a wireless communication, a point-to-point communication, a computer network, e.g. a local area network (LAN) or the like.

At the merge point 203 the shadow vehicle 204* will be deleted as it merges with the real vehicle 204 coming in from the other track 205. The same applies for vehicle 201, which is also treated as being positioned on track 205 by mean of its shadow vehicle 201*.

Hence, in this embodiment, the control unit 207 creates a shadow vehicle for each vehicle approaching the merge point 203. And all vehicles have a shadow vehicle on all the other upstream tracks in a merge control zone. Consequently, by means of the control unit 207 speed and position can be controlled as far upstream as possible so that vehicles can pass through the merge point at full speed and at minimum safety spacing.

It will be appreciated that, in alternative embodiments, the zone controller may treat one of the upstream tracks as a main track, and only introduce shadow vehicles on the main track. The speed control may thus be based on the distances between real and shadow vehicles on the main track.

Even though the merge control unit 207 is shown as one device on FIG. 2, it is understood that the control unit can comprise one or more parts, in one or more locations. The merge control unit 207 may be one of the zone control units described in connection with FIG. 1. Alternatively, the merge control unit 207 may be a separate unit or a separate functional module integrated in a zone controller. Even though only one merge control unit is shown in FIG. 2, it is understood that the PRT system may comprise any suitable number of merge control units. Furthermore, even though only two vehicles and two tracks are shown in the FIG. 2, it is understood that there can be any number of vehicles and any number of tracks in a merge control zone and in a PRT system.

FIG. 3 schematically illustrates an example of the distance control between real and shadow vehicles. In particular, FIG. 3 illustrates an example, where the distance d between a vehicle 201 and a shadow vehicle 204* is controlled to increase in a merge control zone.

Vehicles running on a track are controlled to maintain a safe distance to the nearest vehicle ahead on the same track, but this does not ensure safety for vehicles approaching a merge point on different tracks, since there will generally not be a safe distance between vehicles and shadow vehicles. A safety distance $d_s$ should therefore be reached when vehicles come to the merge point (or reach a predetermined proximity of the merge point), since vehicles from different tracks otherwise may collide when they pass the merge point. The accepted distance between a vehicle and a preceding shadow vehicle is gradually increased from at least 0 at the entrance to the merge control zone up to the minimum safety distance $d_s$ between real vehicles at the merge point.

In FIG. 3*a* vehicle 201 and vehicle 204 are seen on upstream tracks 202, 205 at the entrance of the merge control zone, indicated by line 208. The vehicles 201, 204 in FIG. 3*a* are shown to have the same distance to the merge point 203, but it is understood that the vehicles also can have different distances to the merge point.

In FIG. 3*b* the vehicles have entered the merge control zone, and the vehicle 204 on track 205 is now treated as a shadow vehicle 204* on track 202. The distance d between vehicle 201 and shadow vehicle 204* is increased from 0 at the entrance of the merge control zone 208, and the distance d is now bigger than 0.

The control unit 207 controls the vehicle speeds of vehicles 201 and 204 such that the distance between vehicle 201 and shadow vehicle 204* increases in the merge control zone. The increase can be performed by that one vehicle travels faster and/or the other vehicle travels slower or brakes etc.

In FIG. 3*c* the vehicle 204 on track 205 is just about to pass the merge point 203, and the distance d between the vehicle 201 and the shadow vehicle 204* is now increased to the safety distance $d_s$.

FIG. 4 schematically shows an example of a rule for assigning merge control priorities based on the load status of the vehicles approaching the merge point. For example, the control system may detect the load status based on sensors at stations, e.g. by means of a scale at the exit of a station. In FIG. 4*a*, a vehicle 209 is shown travelling on an upstream track 202 towards merge point 203. In this example, vehicle 209 is assumed to be loaded with e.g. passengers or goods, indicated by the black fill colour. Similarly, vehicle 210 travels on upstream track 205 and is empty, indicated by the white fill colour.

In one embodiment, based on a set of predetermined merge control priority rules, the control unit 207 will assign a higher priority to the loaded vehicle 209 than to the empty vehicle 210, and therefore the loaded vehicle 209 will be controlled to pass through the merge point 203 before the empty vehicle 210, the results of which is seen in FIG. 4*b*, where loaded vehicle 209 travels in front of empty vehicle 210 on the downstream track 206.

Additionally, when two vehicles having the same load status (e.g. both vehicles are empty or both vehicles are loaded) approach the merge point, the control system may assign merge priorities to the respective vehicles based on additional information, e.g. the number and load status of further upstream vehicles on the respective upstream tracks. For example, a higher vehicle priority may be assigned to a vehicle followed by a larger number of subsequent loaded vehicles approaching the merge point on the same upstream track. Such a priority rule taking into account the load status of subsequent vehicles may even be used when the first vehicles approaching the merge point on each track have different load status, thus avoiding an unnecessary delay of vehicles carrying passengers or goods.

Alternatively or additionally, a merge priority rule may assign different priorities to vehicles exiting from a station, e.g. at a merge point where an exit track from a station merges with the main track. For example, if the system is overloaded it may be advantageous to restrict new vehicles from entering the main track from a station so as to avoid further congestion. Another advantage of this priority rule is that it is generally less of a discomfort for a starting vehicle to wait than for a running vehicle to slow down or stop. On the other hand if one station is very crowded it may be desirable to give priority to exiting vehicles from that station.

Hence, the above is an example of a priority rule that further depends on one or more overall system parameters, e.g. an overall performance parameter, indicative of a property of the entire network or a predetermined part of a network, such as a station, a sub-net, a link between two nodes, etc. Consequently, the assignment of priorities may vary over time depending on the overall system performance.

In one embodiment, the assignment of merge priorities takes properties of the upstream links and/or properties of the vehicles travelling on the upstream link into account. Here, the term link refers to the track connecting two nodes of the network, e.g. two merges or diverges.

For example, a merge priority rule may reduce the risk of queues spilling back to the next upstream node where it may block vehicles in other directions. In particular, one example of such a rule takes into account the length of each upstream link of a merge point. For example, the rule may give a higher priority to vehicles approaching the merge point on the upstream link with lowest free capacity. For example, the free capacity of a link/track may be determined as the (maximum) capacity of the link minus the number of vehicles on the link. This rule is particularly useful to avoid congestion in systems near capacity.

It will be appreciated that embodiments of the method described herein may use a combination of the above and/or alternative rules, e.g. by calculating weighted sums of priorities calculated according to different rules, and/or by selecting different rules responsive to the overall system performance. For example, when the system operates close to its capacity, different rules may be used than in situations when the system is only sparsely populated by vehicles.

FIG. 5 schematically shows an example of a merge control zone. The merge control zone 208 of the merge point 203 is shown to start right after preceding merge points 210 and 211, i.e. at different distances from the merge point 203 at track 202 and track 205, and thereby to cover different lengths of these upstream tracks. The length of upstream track 202 is shorter than the length of upstream track 205, because of the preceding upstream merge point 210 where upstream tracks 212 and 213 merge to form track 202.

In some embodiments, the control of vehicles may even extend beyond the next upstream merge by communication between the respective merge controllers. For example, a first merge control unit 215 of merge point 210 may communicate information about a vehicle passing its merge control zone 214 to a second merge control unit 207 controlling the downstream merge point 203, where the vehicle is heading towards. This way the merge control unit 207 can plan the vehicle passage in good time before the vehicle actually enters the merge control zone 208 of the merge control unit 207.

FIG. 6 shows a flowchart of an example of an overall method of merge control. In step 501 a vehicle travelling towards a merge point on an upstream track in a PRT system is detected to enter a merge control zone of the merge point, e.g. by means of the vehicle communicating with the merge control unit, by means of in-track vehicle sensors detecting the presence of the vehicle, and/or the like. In step 502, the control unit calculates an assigned passage time for the vehicle to pass through the merge point, which ensures that there is a predetermined safety distance between the vehicle and shadow vehicles from other upstream tracks which are to pass the same merge point, so that the vehicles do not collide with each other at the merge point. The control unit calculates the passage time in accordance with predetermined merge control priorities as described herein. In step 503, the merge control unit generates a data structure indicative of a shadow vehicle corresponding to the approaching vehicle but on another upstream track. In step 504, the control unit causes the vehicle speed to be adjusted so that the vehicle can pass the merge point at the assigned passage time and such that a safety distance between real and shadow vehicles is maintained. As described herein, the safety distance between shadow vehicles and real vehicles may be a function of the distance from the merge point. The vehicle may control its own speed based on the passage time and/or speed commands communicated from the emerge controller to the vehicle. Alternatively, the vehicle speed may be controlled by motor control units placed along the track. In step 505 the vehicle is detected to pass the merge point at the assigned passage time having at least the predetermined safety distance to the other vehicles in the merge control zone. In step 506, the merge control unit removes the corresponding data record representing the shadow vehicle and continues normal speed control of the vehicle on the down stream track.

The method and control systems described herein and, in particular, the vehicle controller, merge/zone controller, and motor controller described herein can be implemented by means of hardware comprising several distinct elements, and by means of a suitably programmed microprocessor or other processing means. The term processing means comprises any circuit and/or device suitably adapted to perform the functions described herein, e.g. caused by the execution of program code means such as computer-executable instructions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

In the device claims enumerating several means, several of these means can be embodied by one and the same item of hardware, e.g. a suitably programmed micro-processor, one or more digital signal processor, or the like. The mere fact that certain measures are recited in mutually different dependent claims or described in different embodiments does not indicate that a combination of these measures cannot be used to advantage.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In particular, embodiments of the invention have mainly been described in connection with an in-track PRT system. However, it will be appreciated that other PRT systems, e.g. on-board PRT systems, and other propulsion systems, as well as automated vehicle systems other than PRT systems may be applied in connection with the present invention.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of controlling merging of a plurality of streams of vehicles in an automated vehicle system, the automated vehicle system including a network of tracks along which the vehicles are adapted to travel, the network including at least one merge point at which at least two upstream tracks merge to form a downstream track, the method comprising:

defining a merge control zone associated with the merge point, the merge control zone defining at least respective sections of the upstream tracks;

detecting a vehicle entering the merge control zone on a first one of the upstream tracks, the vehicle being a vehicle of a sequence of one or more vehicles approaching the merge point on said first upstream track;

allocating a passage time to the detected vehicle, the passage time being indicative of a time at which the vehicle is scheduled to pass the merge point; wherein allocating the passage time is based on a merge priority assigned to the vehicle according to a predetermined set of merge priority rules;

controlling a speed of the vehicle responsive to the allocated passage time.

2. A method according to claim 1, comprising assigning a merge priority to the vehicle according to the predetermined set of merge priority rules, wherein at least one merge priority rule is a function of a property of at least one vehicle of said sequence of vehicles.

3. A method according to claim 2, wherein the property is a load status of the at least one vehicle of said sequence of vehicles.

4. A method according to claim 3, comprising assigning a higher merge priority to loaded vehicles than to empty vehicles.

5. A method according to claim 4, further comprising communicating the allocated passage time to the vehicle; and wherein controlling the speed of the vehicle is performed by the first vehicle responsive to the communicated passage time.

6. A method according to claim 3, further comprising communicating the allocated passage time to the vehicle; and wherein controlling the speed of the vehicle is performed by the first vehicle responsive to the communicated passage time.

7. A method according to claim 2, the method comprising assigning a higher priority to a vehicle followed by a first number of vehicles than to a vehicle followed by a second number of vehicles, the second number being smaller than the first number.

8. A method according to claim 7, further comprising communicating the allocated passage time to the vehicle; and wherein controlling the speed of the vehicle is performed by the first vehicle responsive to the communicated passage time.

9. A method according to claim 2, the method comprising assigning a higher priority to a vehicle followed by a first sequence of vehicles on the first upstream track than to another vehicle followed by a second sequence of vehicles on a second upstream track, the first upstream track having a lower free capacity than the second upstream track.

10. A method according to claim 9, further comprising communicating the allocated passage time to the vehicle; and wherein controlling the speed of the vehicle is performed by the first vehicle responsive to the communicated passage time.

11. A method according to claim 2, further comprising communicating the allocated passage time to the vehicle; and wherein controlling the speed of the vehicle is performed by the first vehicle responsive to the communicated passage time.

12. A method according to claim 1, further comprising communicating the allocated passage time to the vehicle; and wherein controlling the speed of the vehicle is performed by the first vehicle responsive to the communicated passage time.

13. A method according to claim 1, wherein controlling the speed of the vehicle comprises communicating one or more speed commands for adjusting the speed of the vehicle to a motor controller adapted to control one or more motors for propelling the vehicle along the track.

14. A method according to claim 1, the method comprising monitoring a distance between the vehicle and at least another vehicle in the merge control zone, the other vehicle travelling along a second one of the upstream tracks different from the first track.

15. A method according to claim 14; wherein monitoring comprises representing the other vehicle by a virtual shadow vehicle travelling along the first upstream track at a position corresponding to a position of the other vehicle along the second upstream track; and monitoring the distance as a distance between the vehicle and the shadow vehicle.

16. A method according to claim 14, the method comprising:

controlling the vehicle speed of at least one of the vehicle and the other vehicle so as to maintain a predetermined minimum distance between the vehicle and the other vehicle.

17. A method according to claim 16, wherein the minimum distance is a function of a vehicle distance of at least one of the vehicle and the other vehicle from the merge point, wherein the minimum distance increases with decreasing vehicle distance from the merge point.

18. A method according to claim 17, wherein the minimum distance increases to at least a predetermined safety distance between vehicles travelling along the same downstream track.

19. A method according to claim 1, wherein the automated vehicle system is a personal rapid transit system.

20. A control system for controlling merging of a plurality of streams of vehicles in an automated vehicle system, the automated vehicle system including a network of tracks along which the vehicles are adapted to travel, the network including at least one merge point at which at least two upstream tracks merge to form a downstream track, the system comprising:

means for detecting a vehicle entering a merge control zone associated with the merge point on a first one of the upstream tracks, the merge control zone defining at least respective sections of the upstream tracks, the vehicle being a vehicle of a sequence of one or more vehicles approaching the merge point on said first upstream track;

means for allocating a passage time to the vehicle, the passage time being indicative of a time at which the vehicle is scheduled to pass the merge point; wherein allocating the passage time is based on a merge priority assigned to the vehicle according to a predetermined set of merge priority rules;

means for controlling a speed of the vehicle responsive to the allocated passage time.

* * * * *